United States Patent [19]
Hill et al.

[11] Patent Number: 5,862,979
[45] Date of Patent: Jan. 26, 1999

[54] CARD CARRIER FORMS FOR AUTOMATIC EMBOSSED CARD PACKAGE PRODUCTION SYSTEM

[75] Inventors: Jeffery L. Hill, Mundelein; Gregory S. Hill, Lake Zurich, both of Ill.; Robert J. Bretl, Menominee, Mich.

[73] Assignee: Dynetics Engineering Corporation, Lincolnshire, Ill.

[21] Appl. No.: 313,548

[22] Filed: Sep. 23, 1994

Related U.S. Application Data

[63] Continuation of Ser. No. 36,436, Mar. 24, 1993, abandoned, which is a continuation-in-part of Ser. No. 19,865, Feb. 19, 1993, abandoned.

[51] Int. Cl.[6] ............................ B65D 27/00; B65D 27/08
[52] U.S. Cl. ...................................... 229/92.1; 40/124.12
[58] Field of Search ........................... 229/71, 92.1, 92.3, 229/92.8; 40/124.2, 124.4

[56] References Cited

U.S. PATENT DOCUMENTS

| | | | |
|---|---|---|---|
| 1,106,058 | 8/1914 | Rand | 229/92.8 |
| 1,141,172 | 6/1915 | Clark | 229/92.8 |
| 1,171,592 | 2/1916 | Coit | 229/92.8 |
| 1,932,536 | 10/1933 | Standal et al. | 229/92.1 |
| 3,484,097 | 12/1969 | Jory | 270/58 |
| 4,034,210 | 7/1977 | Hill et al. | |
| 4,384,196 | 5/1983 | McCumber et al. | |

FOREIGN PATENT DOCUMENTS 2900259  7/1979  Germany ............................. 229/92.1

Primary Examiner—Stephen P. Garbe
Attorney, Agent, or Firm—Potthast & Associates

[57] ABSTRACT

Card carrying mailing forms (10, 80) with a planar resilient body of paper (12, 82) having fold lines (14, 16 and 84, 86) equally dividing the body (12, 82) into a leading end section (18, 88), a middle section (20, 90) and a lagging end section (22, 92). In one embodiment of the carrier form (10) ears (66) are opened by bending the planar body (12) to receive cards held within a pair of corner pockets (38, 40) by a flap (50) cut from the middle section (20) of the body (12) which also is moved to an operative position by bending the body (12). In another embodiment of the carrier form (80), pockets (98, 100) are made from rectilinear cuts to enable opening of the pockets (98, 100) by means of a roller and the cards (30) are held in the pockets by folding the lagging end section (88) over the middle section (90) adjacent the edge (102) of the card (30).

6 Claims, 2 Drawing Sheets

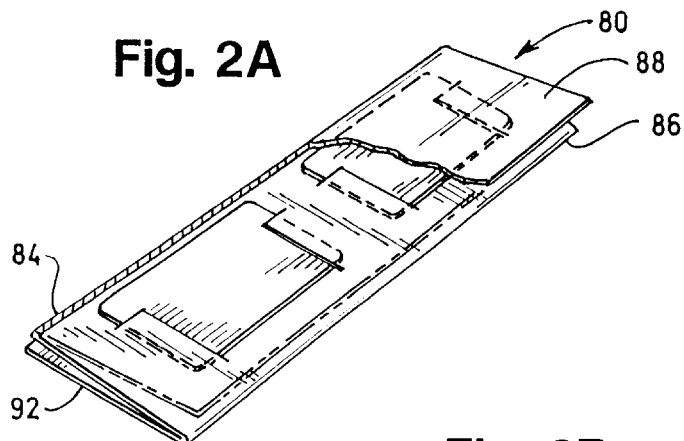
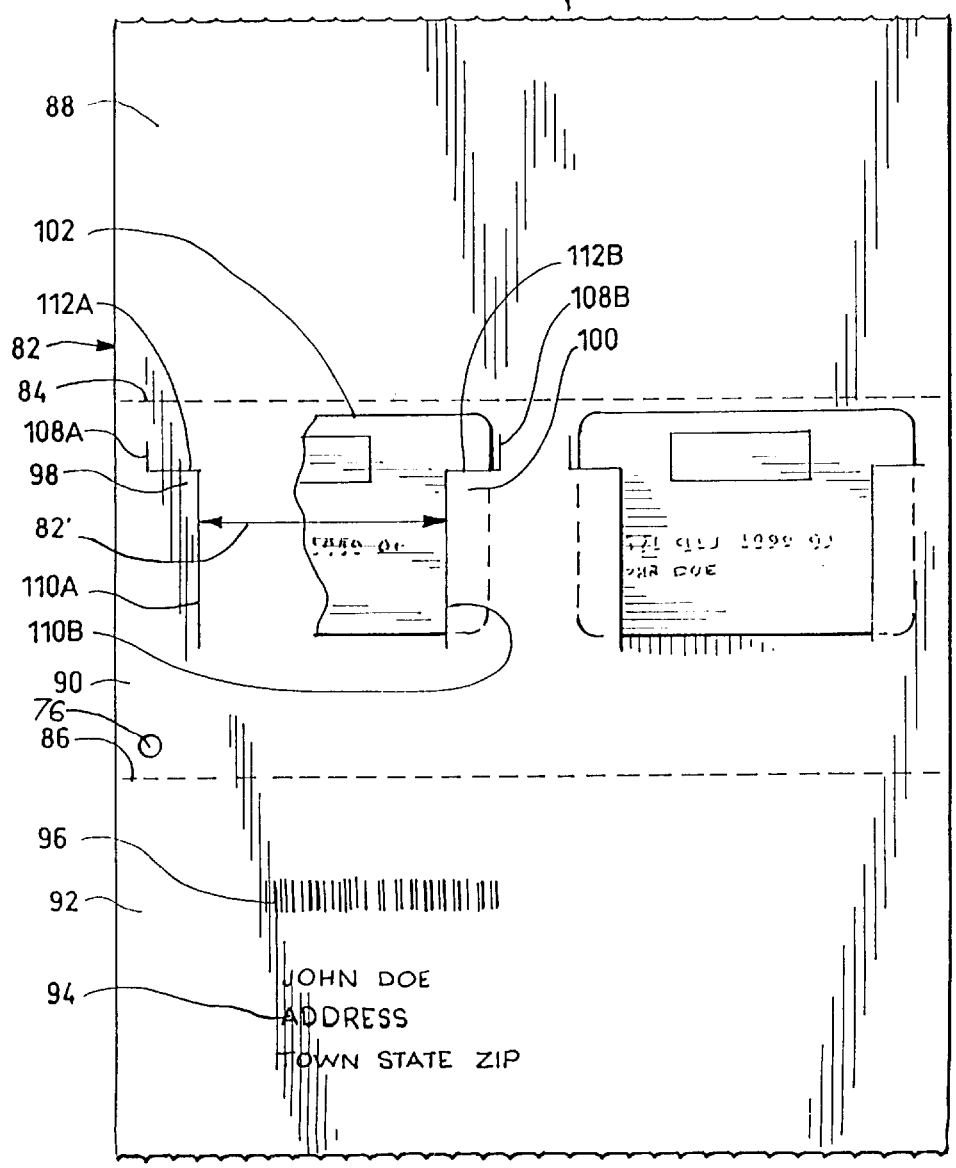

CARD CARRIER FORMS FOR AUTOMATIC EMBOSSED CARD PACKAGE PRODUCTION SYSTEM

CROSS-REFERENCE TO RELATED APPLICATIONS

This is a continuation of U.S. application Ser. No. 08/036, 436, filed Mar. 24, 1993, now abandoned, which is a continuation-in-part of U.S. patent application Ser. No. 08/019,865 of Hill et al. filed Feb. 19, 1993, now abandoned, for "Automatic Embossed Card Package Production Apparatus and Methods".

BACKGROUND OF THE INVENTION

1. Field of the Invention

This invention is related to card carrier forms to which are mounted credit cards and the like for mailing and, particularly, to such carrier forms in which the cards are mounted automatically by mechanical, nonadhesive means.

2. Description of the Prior Art Including as Disclosed Under 37 CFR 1.97–1.99

It is well known to mount or insert credit cards and the like to planar card carrier forms made of paper which, in turn, are inserted into window envelopes. The carriers each have a pair of parallel, preweakened fold lines which divide the carrier body into three substantially equal sections: a leading end section, middle section and a lagging section. The cards are mounted to the middle section and the carrier is folded along the fold lines to fold the leading and lagging sections over opposite sides of the middle section. One of the end sections bears the card owners name and address, and the folded carrier form matches the size of a window envelope in which the carrier form is "stuffed" or inserted. The name and address on the end section is held in alignment by the envelope for viewing through a translucent window of the envelope.

In known carriers shown in U.S. Pat. Nos. 4,381,196 issued May 17, 1983 to McCumber et al. and No. 4,034,210 issued Jul. 5, 1977 to Hill et al., the card is held against removal from a pocket formed from a cut in the body of the carrier by wedge trapping of at least one of two opposed edges of the card by folding the end sections over the opposed edges of the card at opposite sides of the middle section. In the carrier of McCumber et al., a pair of corner pockets are also formed by open slots cut out of the card body. These corner pockets disadvantageously have unattractive entry holes or open slots that result in the production of chaff when the carriers are made and present an unattractive appearance. In addition the pockets are formed by cuts extending along diagonal lines which disadvantageously requires the use of oscillating arms to open the pockets during insertion. In the carrier form of Hill et al. on the other hand, the entire card is inserted through a single edge slot and both edges are wedge trapped by the ends section on opposite sides of the middle section of the body.

SUMMARY OF THE INVENTION

It is therefore the principal object of the present invention to provide card carrying mailing forms, or carriers, with features which overcome the disadvantage of known carriers noted above.

This objective is achieved in part by providing a carrier form for carrying a card having two pairs of opposed corners, comprising a flexible planar body for supporting at least one card, a pair of spaced corner pockets carried by the body for receipt of one of the pair of opposed corners of the card to hold the card against movement in three of four possible rectilinear directions and a flap carried by the body for entrapping engagement with an edge of the card intermediate another one of the opposed pair of corners opposite the one pair of corners to releasably hold the card against movement out of the corner pockets in a fourth of the four possible rectilinear directions.

Preferably, the corner pockets and flap are formed from sheets cut through the body and they are located to hold the card spaced from the peripheral edge of the card. Both the pockets and the flap resiliently flex from the planar body when the body is bent to open the pockets for receipt of the card corners and for the flap to resiliently flex from the planar body to ride up and over the edge of the card when the body is bent and unbent while the card is in the corner pockets.

Obtainment of the object of the invention is also achieved in part by provision of a mailing form for carrying a card, comprising a flexible planar body with one section connected at a fold line to another section for supporting at least one card, a pair of rectilinear slots cut in the body to form a pair of opposed corner pockets spaced from the fold line for receipt of opposed corners of the card to hold the card adjacent the fold line, each rectilinear slot having a pair of spaced slot sections parallel to each other and a cross slot section transversely extending between the pair of parallel spaced slot sections, said other sections foldable over the one section to block removal of the corners of cards from the corner pockets.

Preferably the pockets are formed from closed slots to provide a pleasant appearance; the cross slot section extends between adjacent ends of the pair of parallel slot sections, and the distance between the outside ones of the parallel slot sections is sufficiently greater than the dimensions of a card to enable receipt of multiple cards.

BRIEF DESCRIPTIONS OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 2A is a perspective view of the preferred embodiment of another type of carrier in folded condition in which the cards are held in corner pockets by means of a sectional fold at the periphery of the carrier body which blocks removal of the cards from the pockets when folded; and FIG. 2B is an enlarged detailed view of the carrier of FIG. 2A prior to folding.

DESCRIPTION OF THE PREFERRED EMBODIMENTS

Figure 1A:
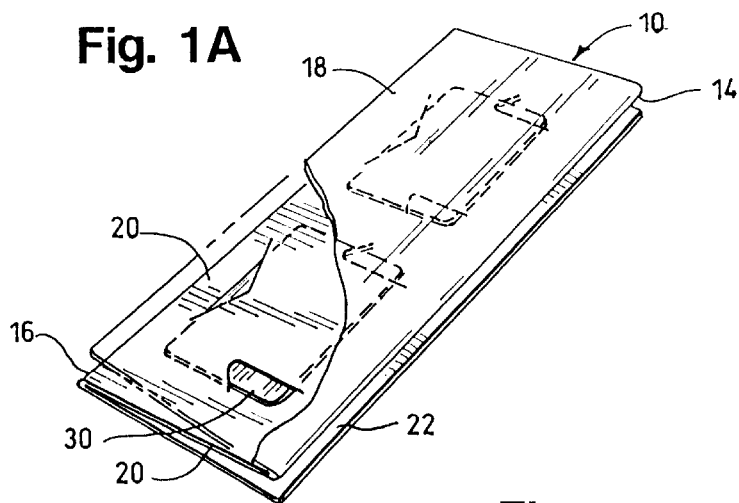
FIG. 1A is a perspective view of the preferred embodiment of one type of carrier in folded condition in which the cards are held by means of a pair of corner pockets and a flap at a location spaced from the periphery of the carrier body.
Figure 1B:
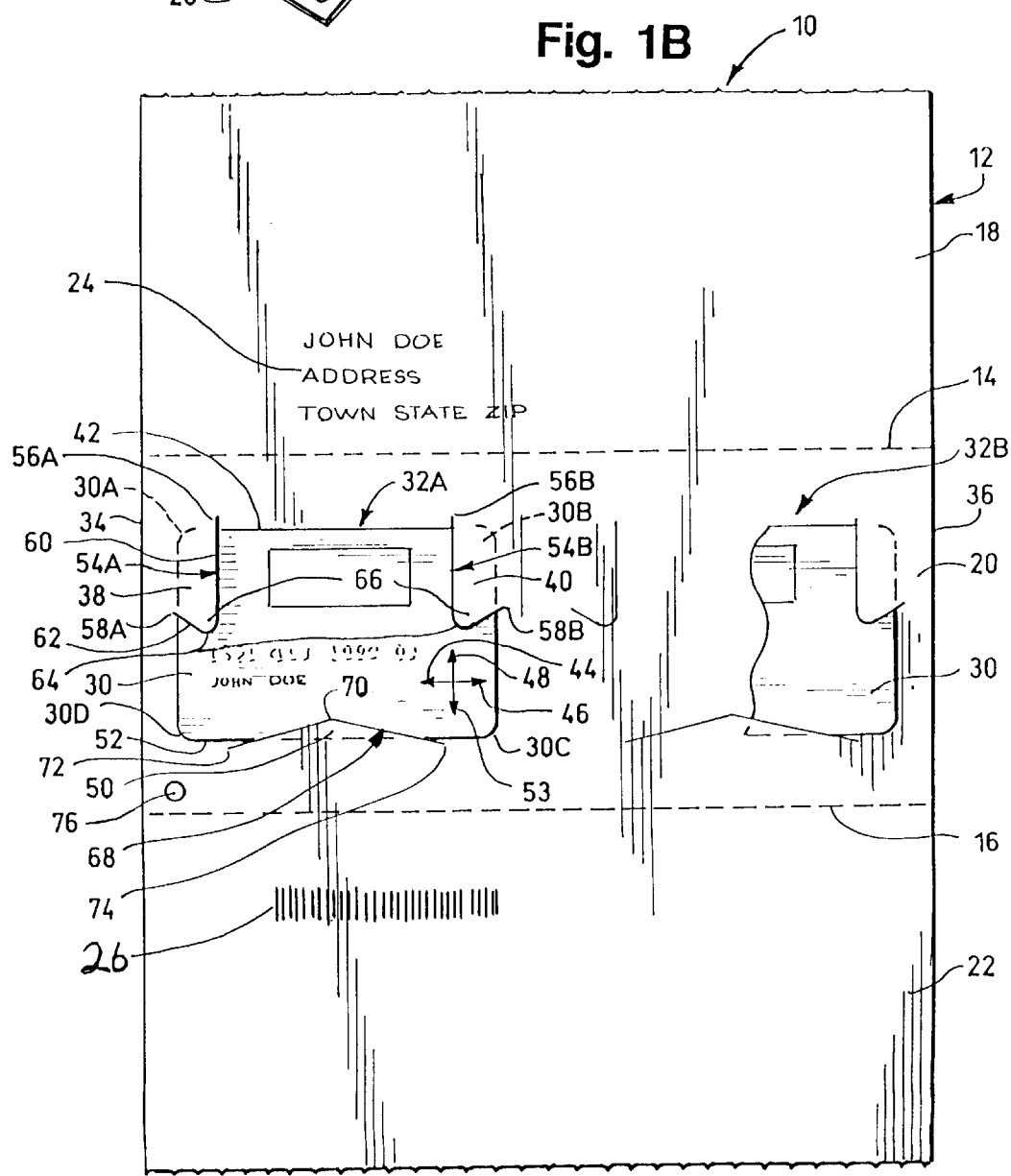
FIG. 1B is an enlarged detailed view of the carrier of FIG. 1A prior to folding.

Referring first to FIGS. 1A and 1B the preferred embodiment of the first kind of carrier form is seen to have a rectangular planar paper body 12 with a leading fold line 14 and a lagging fold line 16. The fold lines divide the carrier body 12 into three rectangular sections: a leading end section 18, a middle section 20 and a lagging end section 22 which are approximately the same size.

Preferably, carrier form 10 has a name and address field 24 at which the name and mailing address of the individual to whom the carrier is to be mailed is printed located at the leading end section 26. In addition, the lagging end section 22 also has printed thereon in machine readable code at a code field 26, also at the lagging end section 22, the account number or other identifying information which should match the account number embossed and magnetically encoded on the cards to be mounted to the carrier. Preferably, this code is a photoptically readable bar code such as: (1) interleaved two of five code; (2) three of nine code; (3) Codabar UPC-A&E code; (4) EAN-8 code; and (5) EAN-13 code.

The lagging end section 22 typically contains written material, such as contract terms, graphics, or the like (not shown). As next seen in FIG. 1B, after one to a maximum of four cards 30 are mounted to the middle section 20, the front side of the middle section 20, as shown in FIG. 1B, is folded along fold line 16 over the top of the lagging section, as shown in FIG. 1B, and the leading end section 18 with the name and address field 24 facing outwardly is folded over the back side of the middle section 20.

Referring still to FIG. 1B, substantially identical card carrying stations 32A and 32B which respectively carry the cards 30 in attractive side by side relationship in the middle of the middle section 20 spaced from the periphery of the carrier form defined by the pair of fold lines 14 and 16 and the opposite parallel sides 34 and 36 of the carrier body 12 extending between which the fold lines 14 and 16 extend. Preferably, each of these card carrying stations 32A and 32B is capable of carrying at least a pair of cards 30 stacked one atop the other.

Referring to card carrying station 32A, FIG. 1B, each of the card carrying stations has a pair of spaced corner pockets 38 and 40 carried by the middle section 20 of the card body 12 for receipt of one of the pair of opposed corners 30A and 30B on opposite sides of an edge 42 of the card. These pockets 30A and 30B hold the card 30 against relative movement in either of the two rectilinear directions parallel to card edge 42 indicated by doubled headed arrows 44 and 46 and in one of the rectilinear directions transverse to edge 42, indicated by arrow 48.

A flap, or lip, 50 carried by the middle section 20 of the body 12 engages an edge 52 of the card 30 opposite the edge 42 intermediate the other pair of corners 30C and 30D to releasably hold the card against movement out of the corner pockets 38 and 40 in the fourth rectilinear direction away from the corner pockets 38 and 40, indicated by arrow 54.

Preferably, the corner pockets 38 and 40 are formed from slots 54A and 54B cut through the body which are closed, i.e. with abutting edges, to avoid the unattractive slots or holes found in known carriers. The slots 54 of corner pockets 38 and 40 extend from first points 56A and 56B, respectively, on the body 12 adjacent to the edge 42 of the card between the corner pockets 38 and 40 when the card 30 is inserted into the pockets to points 58A and 58B, respectively, on the body adjacent the associated side edges 60 and 62 of the card 30. The slots 54A and 54B form mirror images of each other; the points 58A and 58B, and 56A and 56B, respectively, are aligned parallel with each other and with the fold lines 14 and 16.

The slots 54A and 54B are generally L-shaped with each having an elongate section 60 extending generally transverse to the fold lines 14 and 16 which mate with diagonal section 62 at rounded corners 64. The diagonal section 62, rounded corner 62 and a portion of the section 60 form an ear 66. These ears resiliently flex from the planar body 12 when the adjacent portion of the planar body is bent to open the pockets 30A and 30B for receipt of the corners of the card 30. This opening of the pockets 30A and 30B enables the card to be inserted in between the ears 66 and the body 12 intermediate the ears 66 and slid into full engagement with the pockets with edge 42 adjacent end points 56A and 56B of slots 54A and 54B, as shown in FIG. 1B. As seen in FIG. 1B, the distance between side end points 58A and 58B is sufficiently greater than the width of the card, and the diagonal sections 62 extend sufficiently rearwardly toward the direction of card insertion from the side end points 58A and 58B, to enable receipt of at least two cards 30 stacked on top of each other (only one shown).

The flap, or lip 50, like the corner pockets, is formed from closed slots cut 68 through the body 12. Preferably, it has a triangular shape formed by the slot 68 extending inwardly toward the card edge 42 to a point 70 from two points 72 and 74 intermediate the corner pocket sections 60 between the card corners 30C and 30D adjacent the edge 52 of card 30 when inserted in the corner pockets 38 and 40.

The flap 50 like the ears 60 of the ears 66 corner pockets 38 and 40, resiliently flex from the planar body 12 when the planar body 12 adjacent the flap 50 is bent out of a planar configuration. More accurately, when the planar body 12 adjacent the ears 66 and the flap 50 are constrained to conform to a curved surface but the ears 66 and flap 50 are not so constrained the ears 66 and flap 50 maintain the normal planar configuration to resiliently flex away from the curved surface of the body 12. When the body 12 is returned to its normal planar configuration, the ears and flap resiliently return to alignment with the body 12 unless the card is interposed therebetween. In that event, the card is resiliently squeezed between the ears 66 and the flap 50 adjacent body 12 and against the flap 50 and the adjacent part of body 12.

When the planar card 30 is within the corner pockets 38 and 40 while body 12 is curved, or bent away from the corner pockets 38 and 40, the point 70 of flap 50 pivots about a line between end points 72 and 74 and rides along the underside of the card 30 toward the edge 52. After the tip 70 has ridden past the edge, return of the body 12 to a planar condition causes the tip 70 to ride up and over the edge 52 and to the position overlying the front of the carrier body 12, as shown.

Employing the carrier form to maximum advantage is achieved through use of automated equipment to insert cards and fold the carrier. Suitable automated insertion is shown and described in the parent of this application noted above as well as in U.S. patent applications Ser. No. 08/036,657 of Hill et al. entitled "Automatic Verified Embossed Card Package Production Methods" filed Mar. 24, 1993; Ser. No. 08/036,159 of Hill et al. entitled "Card Package Production System With Burster and Carrier Verification Apparatus" filed Mar. 24, 1993; Ser. No. 08/036,664 of Hill et al. entitled "Embossed Card Production System With Modular Inserters For Multiple Forms and Card Verification Apparatus" filed Mar. 24, 1993 and Ser. No. 08/036,439 of Kassabian et al. entitled "Card Package Production System With Modular Carrier Folding Apparatus For Multiple Forms" filed Mar. 24, 1993, all of which are contemporaneously filed herewith, and reference should be made to these applications for details of automated use of the carrier form. Briefly, when used in this automated insertion equipment, the carrier 10 is to run it through a roller with direction of arrow 48 to first bend open the ears 66. Then, one or more cards 30 are automatically inserted into at least one of the pockets of the card carrying stations 32A and 32B. The card 30 is held in the corner pockets while the roller continues to move the conveyor away from the card inserter. The card body 12 adjacent the flap 70 then passes over the roller to pivot the flap 70 over the edge 52 of the card. The carrier is then automatically fan folded into the form shown in FIG. 1A.

It should be appreciated that any other automated equipment which bends the body 12 for purposes of entrapping the card between the lower pockets 38 and 40 and the flap 50 could be successfully employed to automatically insert cards into the carrier 10. Moreover, of course, cards 30 can also be easily inserted into the carriers by manually bending the planar body 12 to open the ears 66 and flap 50 and manually inserting the cards 30.

For purposes of automated use, preferably the location of the name and address field 24 is located in the leading end panel, or leading end section, 18 and the location of the code field 26 is located in the lagging end panel, or lagging end section, 22 and the pockets 38 and 40 face in the direction of arrow 53 away from the leading end section and away from the direction of automated carrier movement indicated by arrow 48. Prior to use, a plurality of the carriers 10 are interconnected in fan folded fashion and each time an end one of the carrier is removed from the other carriers by a "bursting mechanism", the code in code field 26 is read to make sure the carrier is the correct one for the cards presented for mounting to the carrier. In addition, the carrier has a mark, such as a hole 76, for automatic sensing of the position of the carrier 10 during the various steps of automated card insertion. Consequently, the carrier is easily folded into the folded condition shown in FIG. 1A with the address field 24 facing upwardly from leading end panel 18 which covers the back side of the middle section 20 and cards 30, which, in turn, overlies the front side of lagging end section 22.

Referring now to FIG. 2A, a preferred embodiment of another card carrying form, or carrier, 80 which also has a rectangular planar body 82 made of resilient paper which normally maintains a planar configuration, like body 12 of carrier 10. Also, like carrier 10, carrier 80 is shown has a leading preweakened fold line 84 and a lagging preweakened, fold line 86 to divide the planar body 82 into three substantially equal rectilinear sections: a leading end section 88, a middle section 90 and a lagging end section 92. The cards are held in pairs of cooperating pockets 98 and 100 by folding the front side of the leading end section 88 over the front side of the middle section 90 and the cards 30. The address field 94 and the code field 96 are not viewable after the carrier is folded as shown in FIG. 2B, since, unlike carrier 10, the carrier 80 has the name and address field 94 and the code field 96 located on the front side of the lagging end section 92 for the address and name and code to be viewed. The back side of the lagging end section 92 is folded over the back side of the middle section 90 with the front side of the lagging end section 92 facing downwardly, as shown in FIG. 2A. Consequently, in order to have the name and address field 94 and the code field 96 facing upwardly after folding, as in the carrier 10 of FIG. 1A, the carrier form is flipped over prior to stuffing into an envelope with an upwardly facing window.

The opposed corner pockets 98 and 100 are mirror images of one another and are separated from each other by sufficient distance to hold at least one card therebetween, and are preferably capable of holding two cards, with a leading card edge 102 adjacent fold line 84. The corner pockets 98 and 100 are formed by a pair of rectilinear slots 104 and 106, respectively. Each rectilinear slot 104 and 106 has a pair of straight slot sections: an outside slot section 108A and 108B and inside slot sections 110A and 110B which are located parallel to each other and cross slot sections 112A and 112B transversely extending between the pair of parallel spaced slot sections 108A and 110A and 108B and 110B, respectively. The distance between the outside parallel slot sections 108A and 108B and the spacing between parallel slot sections 108A and 110A, and between 108B and 110B, enables receipt of multiple cards within the pockets 98 and 100 in stacked overlying relationship. As seen in FIG. 2B, preferably the cross sections 112A and 112B extend between adjacent ends of the pair of associated slot sections 108A and 110A and 108B and 110B to form an opening for receipt of the corner of the card 30.

These cross sections are opened, i.e. moved laterally away from the plane of the planar body preferably by means of pushing portion 82' of the planar body intermediate the inside sections 110A and 110B. Additionally, unlike the carrier of McCumber et al. which have diagonal cuts forming pockets instead of rectilinear cuts forming the pocket, the rectilinear cuts 110A and 110B are parallel to the direction of movement of the carrier form 80 during automatic insertion. This advantageously enables the opening of the pockets passing the carrier form 80 over a roller with opposite end edges located adjacent the inside parallel cuts 110A and 110B. After the cards are inserted fully into the pockets 98 and 100, as shown in FIG. 2B, the carrier 80 passes from the roller and the leading end section 88 is folded over the edge 102 of the card 30 to keep it in the pockets.

As with the carrier 10, reference should be made to the aforementioned patent applications filed herewith for details of preferred embodiments of the carrier package production system which are designed to employ carrier form 80. Briefly, as noted, a roller with edges adjacent the slot section 110A and 110B is preferably employed to open the pockets 98 and 100.

While a detailed description of the preferred embodiment of the invention has been given, it should be appreciated that many variations can be made thereto without departing from the scope of the invention as set forth in the appended claims.

We claim:

1. A mailing form for carrying a card, comprising:

a flexible planar body with one section connected at a fold line to another section for supporting at least one card; and a pair of rectilinear slots cut in the body to form a pair of opposed corner pockets spaced from the fold line for receipt of opposed corners of the card to hold the card adjacent the fold line, each rectilinear slot having a pair of spaced slot sections parallel to each other and a cross slot section transversely extending between the pair of parallel spaced slot sections, and said slot sections having a pair of distal ends respectively on opposite sides of the cross slot section, said other section foldable over the one section to block removal of the corners of cards from the corner pockets.

2. The card carrying mailing form of claim 1 in which each of the pair of parallel slot sections includes an inside slot and an outside slot.

3. The card carrying mailing form of claim 2 in which the distance between the outside slots of the pair of parallel slot sections is sufficiently greater than the dimensions of a card to enable receipt of multiple cards.

4. The card carrying mailing form of claim 2 including another pair of rectilinear slots in the one section of the body like the one pair of rectilinear slots to hold another card.

5. The card carrying mailing form of claim 1 which the cross slot section extends between adjacent ends of the pair of parallel slot sections.

6. The card carrying mailing form of claim 1 in which card slots are formed from substantially closed cuts.

\* \* \* \* \*